United States Patent [19]
Yang

[11] Patent Number: 6,125,210
[45] Date of Patent: Sep. 26, 2000

[54] METHOD AND APPARATUS FOR TWO-DIMENSIONAL WAVELET RECOMPOSITION

[75] Inventor: Liuyang Yang, Portland, Oreg.

[73] Assignee: Intel Corporation, Santa Clara, Calif.

[21] Appl. No.: 08/957,347

[22] Filed: Oct. 24, 1997

[51] Int. Cl.$^7$ .................................................. G06K 9/46
[52] U.S. Cl. ........................ 382/240; 382/232; 382/239
[58] Field of Search ................................... 382/240, 250, 382/232, 239; 358/479; 250/201.9

[56] References Cited

U.S. PATENT DOCUMENTS 5,740,284  4/1998  Wober et al. ........................... 382/250

OTHER PUBLICATIONS

Martucci and Mersereau, The Symmetric Convolution Approach To The Nonexpansive Implementation Of Fir Filter Banks For Images, IEEE Conference on Acoustics, Speech, and Signal Processing, vol. V, pp. V–65–V–68, Minneapolis, Minnesota, Apr. 1993.

Smith and Eddins, Analysis/Synthesis Techniques for Subband Image Coding, IEEE Transactions on Acoustics, Speech, and Signal Processing, vol. 38, No. 8, pp. 1446–1456, Aug. 1990.

Villasenor, Belzer, and Liao, Wavelet Filter Evaluation for Image Compression, IEEE Transactions on Image Processing, vol. 4, No. 8, pp. 1053–1060, Aug. 1995.

Vaidyanathan, Multirate Digital Filters, Filter Banks, Polyphase Networks, and Applications: A Tutorial, Proceedings of the IEEE, vol. 78, No. 1, pp. 56–93, Jan. 1990.

*Primary Examiner*—Jose L. Couso
*Assistant Examiner*—Anh Hong Do
*Attorney, Agent, or Firm*—Blakely, Sokoloff, Taylor & Zafman LLP

[57] ABSTRACT

A system is provided for reconstructing an image from a plurality of sets of data. The system identifies a set of data and identifies intermediate values calculated during a previous iteration, if a previous iteration was performed. Intermediate values for a current iteration are calculated based on the identified set of data and the identified intermediate values. The system generates a two-dimensional array of pixel values based on the calculated intermediate values for the current iteration. The calculated intermediate values are saved for use by a subsequent iteration. The plurality of sets of data are represented by wavelets.

19 Claims, 9 Drawing Sheets

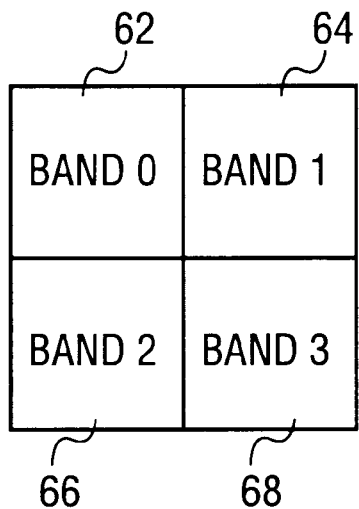
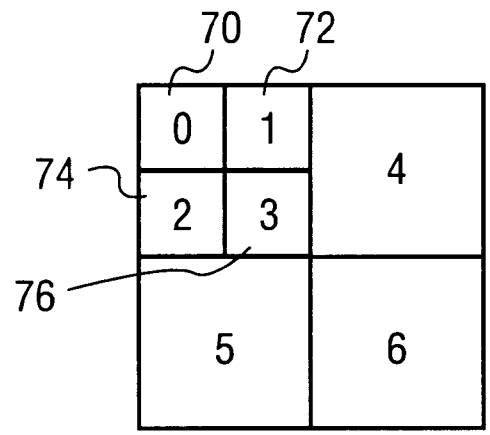
FIG. 5A
FIG. 5B
FIG. 5C

METHOD AND APPARATUS FOR TWO-DIMENSIONAL WAVELET RECOMPOSITION

BACKGROUND OF THE INVENTION

1. Field of the Invention

The present invention relates to signal and data processing systems. More specifically, the present invention provides a system for recomposing an image from an encoded signal.

2. Background

As the transmission size or transmission rate of video data increases, the need for effective and efficient compression and decompression of the video data becomes more important. Various types of image processing systems are available for encoding and decoding images.

Certain image processing systems use techniques involving wavelet technology. A wavelet transforms an image into multiple frequency bands. Each frequency band contains the image at a quarter resolution of the original image, in varying degrees of image quality. As the bands progress from a low frequency to a high frequency, the image quality increases. The lowest frequency band is generally the most important band for visual sensitivity. Therefore, the lowest frequency band is typically the first band transmitted, and the highest frequency band is typically the last band transmitted. Thus, if only the low frequency band is received, the major features of the image are visible even though the information contained in the remaining higher frequency bands is not displayed.

When wavelet techniques are used in a CODEC (COder-DECoder) system, the CODEC consists of a wavelet decomposition module that breaks the image into multiple bands and a wavelet recomposition module that transforms the multiple bands into the image with original resolution.

A wavelet decomposition module calculates a particular pixel value by performing filtering in the neighborhood of pixels surrounding the particular pixel. This filtering is performed in both a horizontal direction and a vertical direction. Similarly, a wavelet recomposition module performs filtering as part of the recomposition process.

In existing systems, the wavelet recomposition filtering process is performed sequentially in two separate steps. First, filtering is performed in one dimension(e.g., horizontally). Next, filtering is performed in a second dimension (e.g., vertically). These existing recomposition modules are calculation-intensive and require two separate passes through the data, which does not effectively utilize cache memory in typical computer systems. Thus, these existing recomposition modules are expensive in terms of Central Processing Unit (CPU) execution time.

It is therefore desirable to provide a wavelet recomposition module capable of efficiently recomposing a wavelet and reconstructing an image from a plurality of bands of data, without the above problems.

SUMMARY OF THE INVENTION

Embodiments of the present invention provide a method of reconstructing an image from multiple sets of data. The system identifies a set of data and identifies intermediate values calculated during a previous iteration, if a previous iteration was performed. Intermediate values are calculated for a current iteration based on the identified set of data and the identified intermediate values. Multiple pixel values are generated based on the intermediate values calculated for the current iteration.

Another embodiment of the invention saves the calculated intermediate values for the current iteration for use by a subsequent iteration.

In an embodiment of the invention, the multiple sets of data are represented by wavelets.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 5A–5C illustrate an example of the transformation of the four bands shown in FIG. 3 into sixteen separate bands.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention provide a system for processing video images including the encoding and decoding of video image data. The image processing system provides an efficient mechanism for the recomposition of wavelets by performing a two-dimensional wavelet recomposition and reducing the computations necessary to calculate pixel values. Embodiments of the invention perform a two-dimensional wavelet recomposition in a single pass through the decoded band image data.

Figure 1:
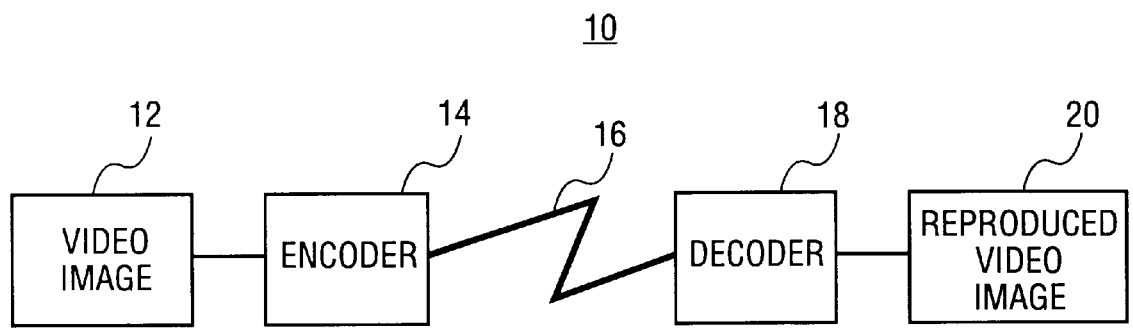
FIG. 1 illustrates an embodiment of an image processing system capable of implementing the teachings of the present invention.

FIG. 1 illustrates an embodiment of an image processing system 10 capable of implementing the teachings of the present invention. Image processing system 10 includes a video image device 12 capable of capturing, generating, storing, or receiving a video image. Video image device 12 may include a camera, recording device, or other mechanism capable of generating a signal representative of a video image. The signal representing the video image is transmitted from device 12 to an encoder 14 (also referred to as a decomposition module for a wavelet image CODEC). The video image signal may, for example, be a stream of pixel data. Encoder 14 receives the video image signal and performs various decomposition and compression operations on the signal and transmits the compressed signal across a communication medium 16. Communication medium 16 may include wires, cables, radio-frequency links, or any other medium capable of propagating signals from a source to a destination.

The compressed video image signal is transmitted across communication medium 16 to a decoder 18 (also referred to as a recomposition module for a wavelet image CODEC). Decoder 18 decodes (or recomposes) the received video image signal to generate a reproduced video image 20 representing the video image captured, generated, or received by device 12. Reproduced video image 20 can be displayed on a display device, stored in a storage device, or otherwise provided to one or more destination devices.

The procedures used to decode the video image signal are discussed below. The image processing components illustrated in FIG. 1 can be implemented in devices customized for video processing. Alternatively, one or more functions performed by the image processing components of FIG. 1 can be implemented by hardware components or software routines in a computer, as discussed below. In alternate embodiments of the invention, one or more storage devices may be utilized to store image data at different stages of the encoding and decoding process.

Figure 2:
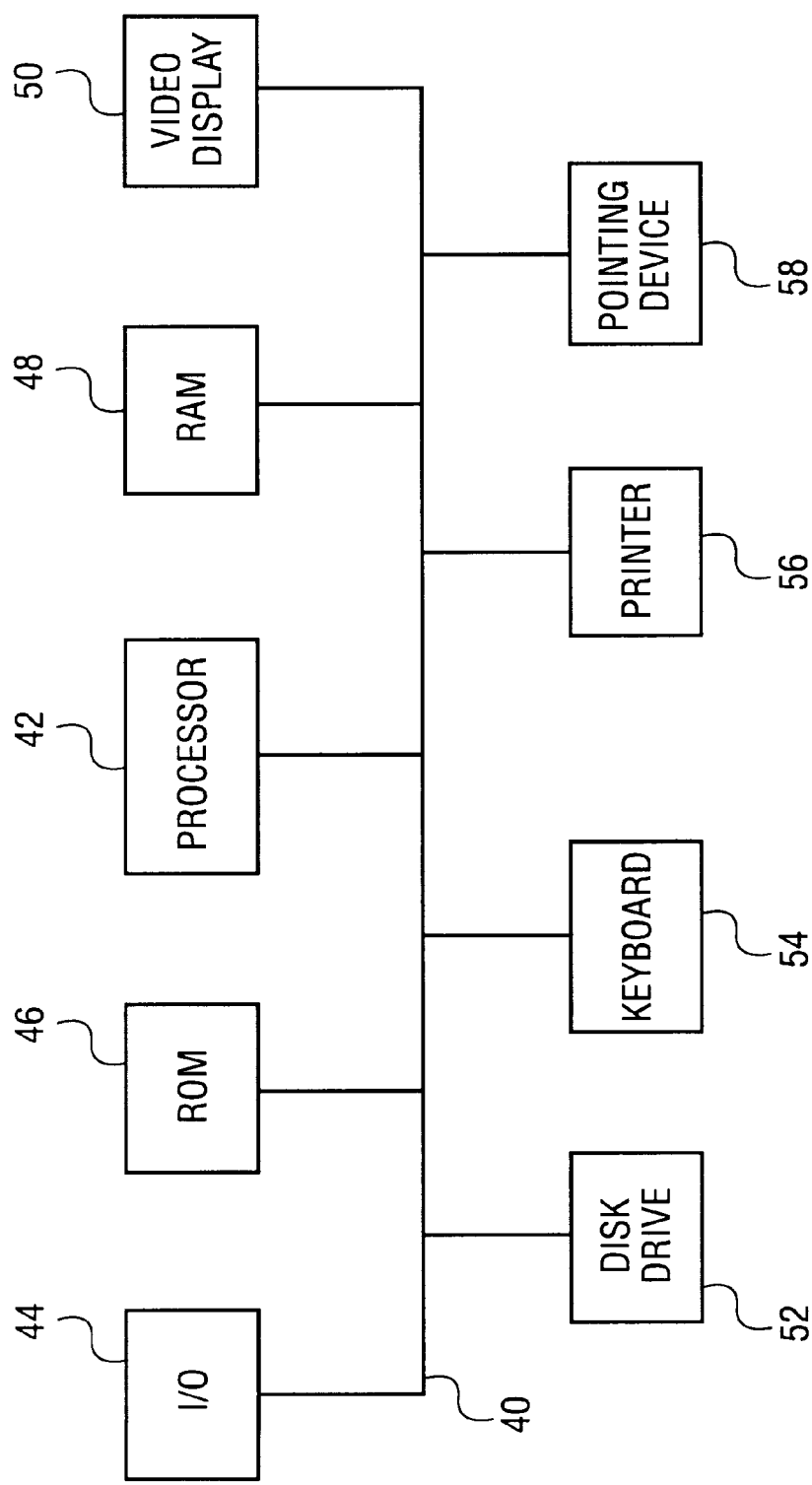
FIG. 2 illustrates a particular embodiment of a computer system capable of performing various image processing functions in accordance with the invention.

FIG. 2 illustrates a particular embodiment of a computer system capable of performing various image processing functions in accordance with the invention. The various components shown in FIG. 2 are provided by way of example only. Those of ordinary skill in the art will appreciate that certain components of the computer system illustrated in FIG. 2 can be deleted for particular implementations of the invention. The computer system shown in FIG. 2 may be any type of computer including a general purpose computer.

The computer system shown in FIG. 2 includes a system bus 40 coupled to various components of the computer. A processor 42 performs the processing tasks, such as image processing functions, required by the computer system. Processor 42 may be any type of processing device capable of implementing the procedures necessary to process video data, as discussed below. An input/output (I/O) device 44 is coupled to bus 40 and provides a mechanism for communicating with other devices coupled to the computer. For example, I/O device 44 may be coupled to receive video image signals from a video capture device such as a camera. Additionally, I/O device 44 may be coupled to communication medium 16 (FIG. 1) to transmit video image data to a destination device.

A read-only memory (ROM) 46 and a random access memory (RAM) 48 are coupled to bus 40 and provide storage mechanisms for the various data and information used by processor 42 and other system components. Although ROM 46 and RAM 48 are shown coupled to bus 40, in alternate embodiments of the invention, ROM 46 and RAM 48 can be coupled directly to processor 42 or coupled to a separate memory bus.

A video display 50 is coupled to bus 40 and displays various information and data, including video images, to the user of the computer system. A disk drive 52 is coupled to bus 40 and provides a mechanism for the long-term mass storage of information. Disk drive 52 may be used to store various images, software programs, and other data generated or utilized by the computer system. A keyboard 54 and pointing device 58 are coupled to bus 40 and provide mechanisms for entering information and commands into the computer. A printer 56 is coupled to bus 40 and capable of creating a hard-copy of information generated by or stored by the computer system.

Figure 3:
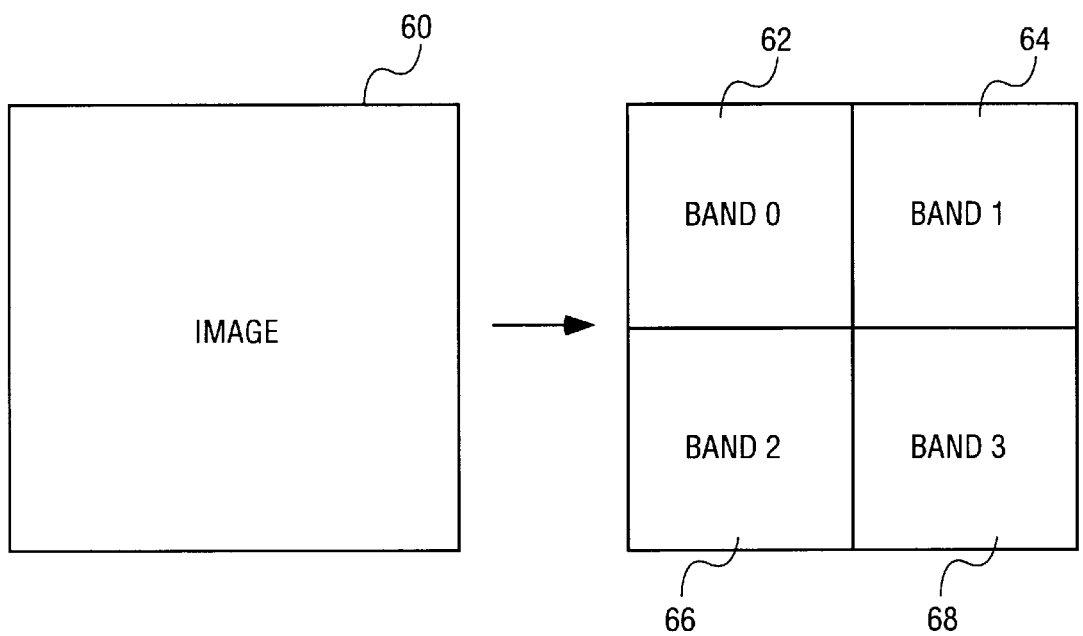
FIG. 3 illustrates an exemplary decomposition of a video image into four separate bands.

Embodiments of the invention utilize wavelets to recompose a video image from multiple bands of video image data. FIG. 3 illustrates an exemplary decomposition of a video image into four separate bands, labeled Band 0, Band 1, Band 2, and Band 3. The decomposition illustrated in FIG. 3 is performed using a wavelet transformation. The wavelet transformation decomposes an original image 60 into four smaller images 62, 64, 66, and 68 (Band 0, Band 1, Band 2, and Band 3, respectively). The information contained in each band 62–68 is determined by selecting various combinations of high frequency components and low frequency components of the original image. These high frequency and low frequency image components are identified using a filter bank, which includes low-pass and high-pass decomposition filters, and low-pass and high-pass recomposition filters. The decomposition filters are also referred to as analysis filters and the recomposition filters are also referred to as synthesis filters. The filters used in wavelet recomposition are discussed in greater detail below.

Band 0 typically contains the low frequency information in both the horizontal and vertical directions. Therefore, Band 0 represents the entire image 60, but does not provide sharp, well-defined edges. Thus, the Band 0 image appears "fuzzy." The remaining bands provide additional data to sharpen or define the edges within the image. For example, Band 1 contains the low frequency components in the horizontal direction and the high frequency components in the vertical direction. Band 2 contains the high frequency components in the horizontal direction and the low frequency components in the vertical direction. Band 3 contains the high frequency components in both the horizontal and vertical directions, thereby identifying diagonal edges within the image.

The low frequency image components, such as those contained in Band 0, are the most important image components for visual sensitivity. Thus, the Band 0 data alone provides sufficient image detail for a person to appreciate the major aspects of the image. The remaining three bands, Band 1 –Band 3, provide edges and add additional detail to the image provided in Band 0 .

Referring again to the image processing system of FIG. 1, in a particular embodiment of the invention, encoder 14 receives a two-dimensional image from video image device 12. Encoder 14 decomposes the two-dimensional image into four bands of data, as shown in FIG. 3. The four bands of data are transmitted across communication medium 16 to decoder 18. Decoder 18 then reconstructs the original image from the four bands of data.

Figure 4:
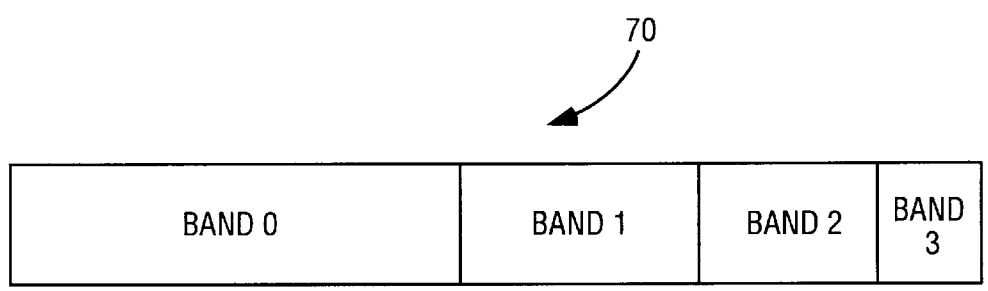
FIG. 4 illustrates an example arrangement of multiple bands into a bit stream.

FIG. 4 illustrates an example arrangement of multiple bands (Band 0–Band 3) into a bit stream (or image file) 70. In the example of FIG. 4, Band 0 typically contains significantly more information than the remaining bands (Band 1–Band 3). As mentioned above, the compressed image may be illustrated using only information contained in Band 0. Although the image will be "fuzzy," the visual sensitivity is sufficient to convey the majority of the data contained in image 60. Each successive band adds additional image detail contained in image 60. Thus, depending on the time available to transmit the image data or the bandwidth available for transmission, one or more of Band 1–Band 3 may be eliminated from the bit stream or image file without significantly affecting the resulting image.

FIG. 3 above illustrates the transformation or decomposition of image 60 into four separate bands 62–68. In particular systems, each band 62–68 is further transformed or decomposed into four additional bands. For example, FIG. 5A illustrates bands 62–68 after the first transformation. As illustrated in FIG. 5B, Band 0 can be transformed into four separate bands 70, 72, 74, and 76. The remaining three bands 64–68 are decomposed in the same manner, resulting in 16 separate image bands (numbered 0–15) as shown in FIG. 5C. By performing this second level of transformation, a wider range of scalability is provided. Thus, up to 16 different levels of image detail may be provided based on the available bandwidth or the rate of transmission available in Aa particular system. For example, in a system with minimal bandwidth or minimal transmission time, only the first few bands of data (such as Bands 0–2) are transmitted. In systems having greater bandwidth resources or increased available transmission time, additional bands of data (such as Bands 0–9) are transmitted. Thus, 16 different levels of scalability are provided by performing two wavelet transformations, rather than the four levels provided by a single wavelet transformation.

In a typical system that uses wavelets to decompose a video image, the decomposition module (i.e., the encoder) processes alternating pixels in the image to generate one image band. For example, to generate Band 0 in a particular row of pixels in the image, the decomposition module may process the first, third, fifth, etc. pixels and ignoring the other pixels (i.e., the second, fourth, sixth, etc. pixels). A typical decoder (recomposition module) recreates the original image by inserting zeroes between alternating pixels in a band received from the decomposition module. As discussed below, various filter coefficients are applied to the received data (and the inserted zeroes) to recreate the original image. Thus, the decoder reconstructs the image at the original resolution although, in each band, only one-half of the actual pixels along each dimension were transmitted to the decoder.

Figure 6:
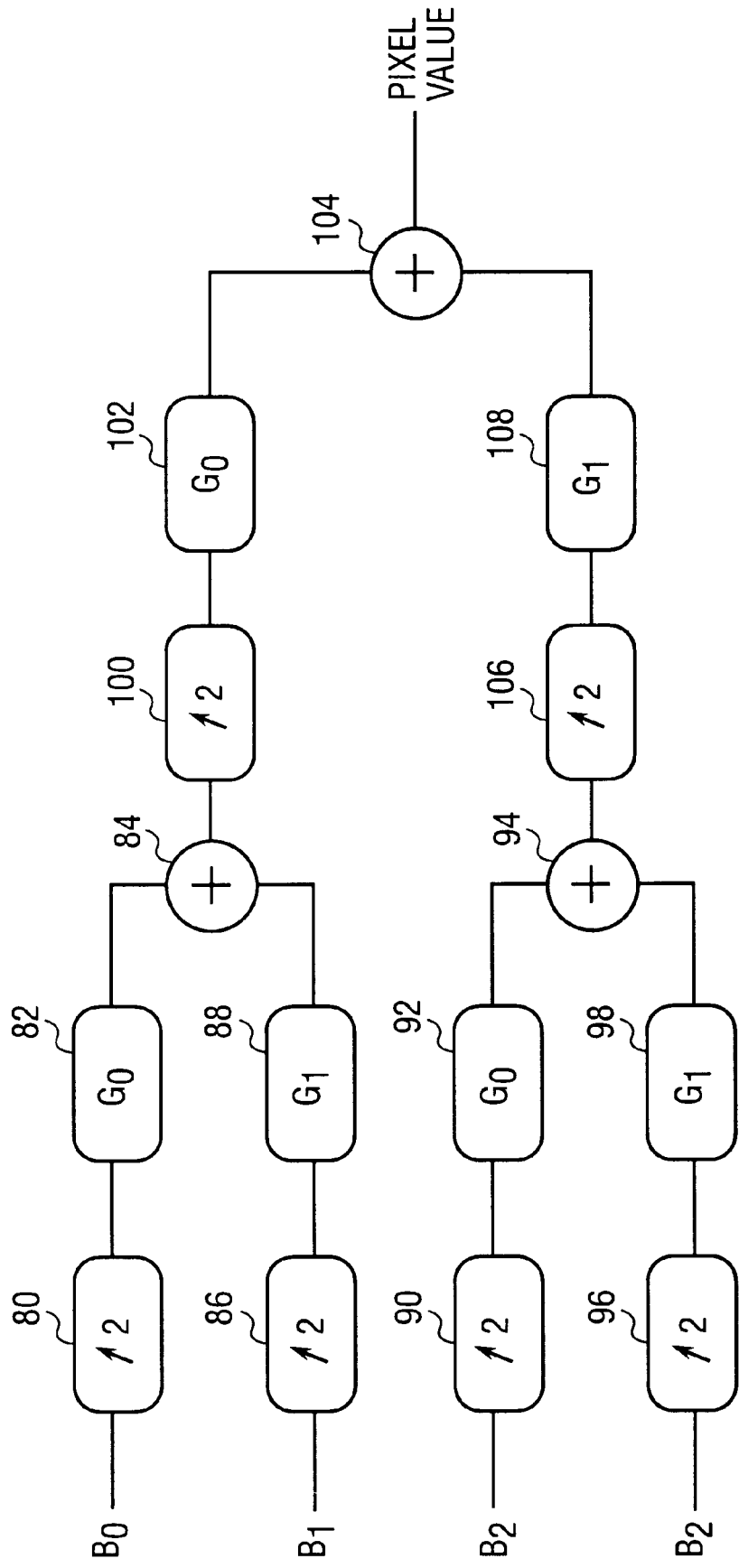
FIG. 6 illustrates an example of a generalized recomposition module.

FIG. 6 illustrates an example of a generalized recomposition module. The recomposition module receives image data in four separate bands, labeled $B_0$, $B_1$, $B_2$, and $B_3$ (representing Band 0, Band 1, Band 2, and Band 3, respectively). Data from Band 0 is received by an expander 80, which inserts a zero pixel value between each pair of pixel values provided in Band 0. The zero pixel value inserted by expander 80 compensates for the processing of alternating pixel data by the decomposition module prior to transmission of the data. After expander 80 has inserted the zero pixel value, the data flows to a low-pass filter 82. Low-pass filter 82 allows only the low frequency components of the signal to pass through the filter to a summation circuit 84.

Data from Band 1 is received by an expander 86, and provided to a high-pass filter 88. High-pass filter 88 allows the high frequency components of the signal to pass through the filter to summation circuit 84. The high-pass and low-pass filters shown in FIG. 6 apply a particular set of filter coefficients to the received data. Summation circuit 84 combines the output signals from low-pass filter 82 and high-pass filter 88 and generates an output signal that is provided to another expander 100.

In a similar manner, Band 2 data is received by an expander 90, and provided to a low-pass filter 92 having its output coupled to a summation circuit 94. Band 3 data is received by an expander 96, which provides its output to a high-pass filter 98. High-pass filter 98 is coupled to summation circuit 98, which combines the output signals from low-pass filter 92 and high-pass filter 98 and generates an output that is provided to an expander 106.

The output from expander 100 is provided to a low-pass filter 102 and the output from expander 106 is provided to a high-pass filter 108. The outputs from low-pass filter 102 and high-pass filter 108 are provided to a summation circuit 104, which generates a pixel value in response to the signals provided by filters 102 and 108.

Low-pass filters 82 and 92, and high-pass filters 88 and 98 perform "vertical filtering" of the image data. Low-pass filter 102 and high-pass filter 108 perform "horizontal filtering" of the image data. "Vertical filtering" refers to filtering along each column of the image and "horizontal filtering" refers to filtering along each row of the image.

The recomposition module illustrated in FIG. 6 generates a single pixel value in response to the four input pixels in the four bands provided to the recomposition module. The module illustrated in FIG. 6 is a generalized recomposition module that accomplishes two-dimensional wavelet recomposition by sequentially performing vertical and horizontal one-dimensional recompositions. Thus, the recomposition module of FIG. 6 requires two separate passes through the data, which does not effectively utilize cache memory and requires additional CPU execution time.

Figure 7:
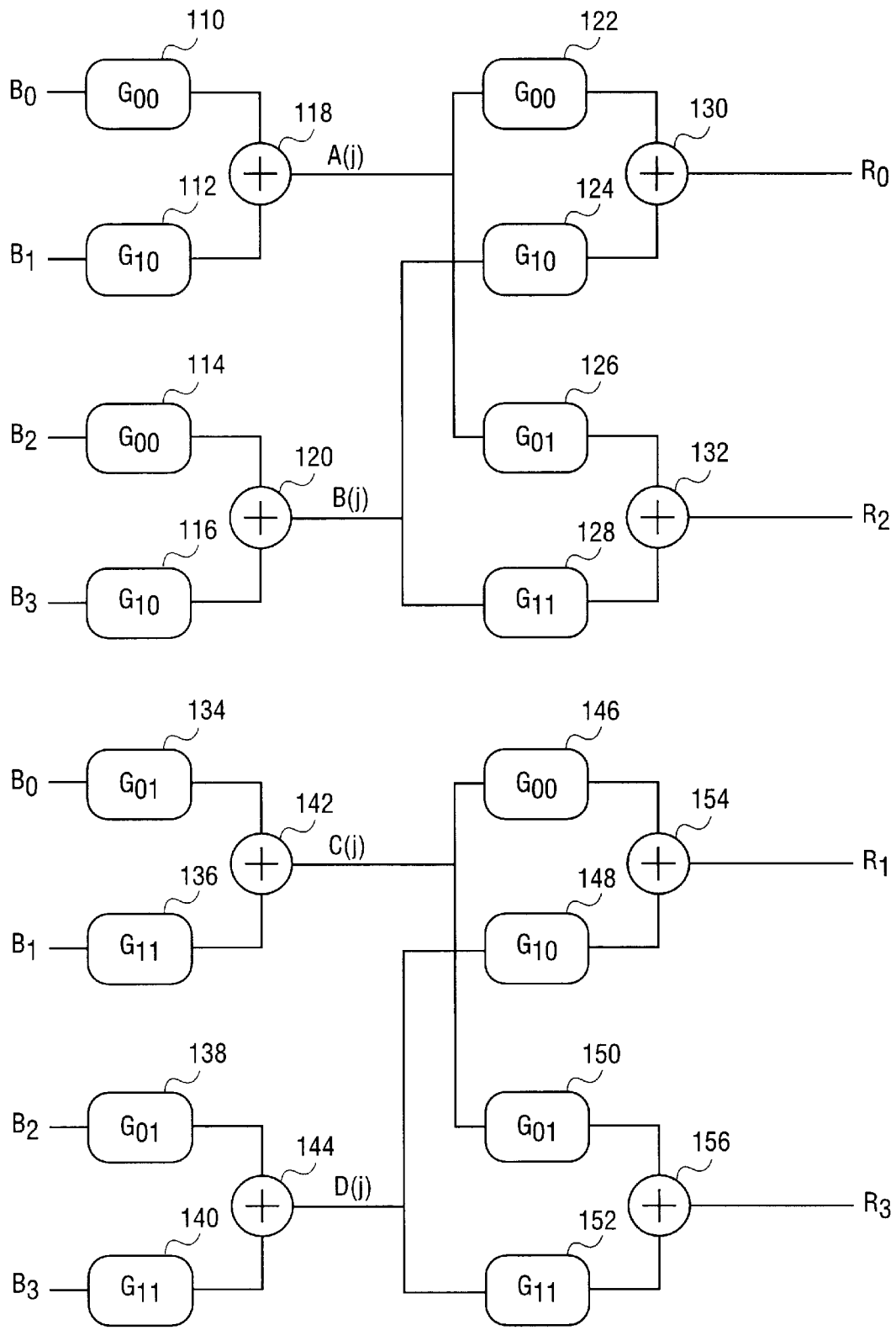
FIG. 7 illustrates an embodiment of an efficient two-dimensional wavelet recomposition module.

FIG. 7 illustrates an embodiment of an efficient two-dimensional wavelet recomposition module according to the present invention. The recomposition module illustrated in FIG. 7 does not use expanders, as shown in FIG. 6. Instead of inserting zeroes for alternating pixel values, the recomposition module of FIG. 7 applies alternating filter coefficients to the received data. Thus, rather than inserting zeroes and later multiplying the filter coefficients by the inserted zeroes, the recomposition module shown in FIG. 7 omits the expanders and the filters apply alternating filter coefficients to the data. The resulting pixel data is the same, but the number of calculations require is significantly reduced.

In FIG. 7, a filter 110 receives data from Band 0 and a filter 112 receives data from Band 1. Similarly, a filter 114 (which is the same as filter 110) receives data from Band 2 and a filter 116 (which is the same as filter 112) receives data from Band 3. A summation circuit 118 receives the output signals from filter 110 and filter 112. Summation circuit 118 generates an intermediate signal, labeled "A(j)", where "j" represents the column index currently being recomposed. Summation circuit 120 receives the output signals from filter 114 and filter 116. Summation circuit 120 generates an intermediate signal, labeled "B(j)".

The output from summation circuit 118 is provided to a pair of filters 122 and 126, and the output from summation circuit 120 is provided to a pair of filters 124 and 128. A summation circuit 130 receives signals from filter 122 and filter 124, and generates an output $R_0$ which represents a first pixel value. Another summation circuit 132 receives signals from filter 126 and filter 128, and generates an output $R_2$ which represents a second pixel value. Additional details regarding the filtering operations and generation of multiple pixel values are provided below.

The bottom portion of FIG. 7 is similar to the upper portion of the figure. A filter 134 receives data from Band 0 and a filter 136 receives data from Band 1. Similarly, a filter 138 (which is the same as filter 134) receives data from Band 2 and a filter 140 (which is the same as filter 136) receives data from Band 3. A summation circuit 142 receives signals from filter 134 and filter 136, and generates an intermediate signal labeled "C(j)". Another summation circuit 144 receives signals from filter 138 and filter 140, and generates an intermediate signal labeled "D(j)".

The output from summation circuit 142 is provided to a pair of filters 146 and 150. Similarly, the output from summation circuit 144 is provided to a pair of filters 148 and 152. A summation circuit 154 receives signals from filter 146 and filter 148, and generates an output $R_1$ which represents a third pixel value. A summation circuit 156 receives signals from filter 150 and filter 152, and generates an output $R_3$ which represents a fourth pixel value.

The recomposition module illustrated in FIG. 7 generates four separate pixel values simultaneously, thereby reducing the total number of iterations by 75 percent. As discussed above, by eliminating the addition of zeroes between each pair of pixel values in the incoming signals for Band 0 –Band 3, the recomposition module reduces the number of unnecessary computations (i.e., multiplying by zero). Furthermore, as illustrated in FIG. 7, certain intermediate values generated within the recomposition module are shared by other components within the module to generate multiple pixel values simultaneously. Specifically, the intermediate values (labeled A(j), B(j), C(j), and D(j)) can be shared by multiple filters in the recomposition module. This sharing of intermediate calculations increases the efficiency of the recomposition module by reducing the overall computational requirements.

Additionally, the intermediate values A(j), B(j), C(j), and D(j) can be used to calculate additional pixel values in subsequent iterations. This sharing of calculation results further reduces the computational requirements of the recomposition module when generating pixel values. Additional details regarding the sharing of intermediate values between iterations are provided below.

In the recomposition module shown in FIG. 7, four different filters ($G_{00}$, $G_{01}$, $G_{10}$, and $G_{11}$) are used. These filters are derived from the two synthesis (or decomposition) filters $G_0$ and $G_1$ using the following Z-transform definition:

$$G_0(Z)=G_{00}(Z^2)+Z^{-1}G_{01}(Z^2)$$

$$G_1(Z)=G_{10}(Z^2)+Z^{-1}G_{11}(Z^2)$$

In other words, $G_{00}$ and $G_{01}$ are the polyphase filters of $G_0$, while $G_{10}$ and $G_{11}$ are the polyphase filters of $G_1$. Thus, $G_{00}$ contains all of the even-indexed filter coefficients of $G_0$, and $G_{01}$ contains all of the odd-indexed filter coefficients of $G_0$. For example, if $G_0(n)=(1, 2, 1)$ with the origin at the second coefficient, then $G_{00}(n)=(2)$ and $G_{01}(n)=(1, 1)$. In a similar manner, polyphase filters $G_{10}$ and $G_{11}$ can be derived from $G_1$.

Figure 8A:
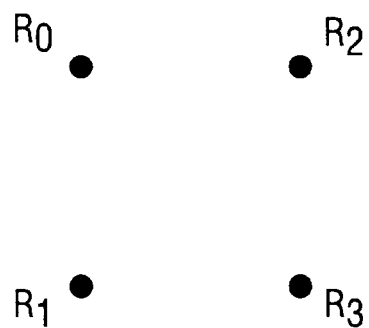
FIG. 8A illustrates an exemplary arrangement of the four pixel values calculated by the recomposition module of FIG. 7.

FIG. 8A illustrates an exemplary arrangement of the four pixel values calculated by the recomposition module of FIG. 7. Pixel values $R_0$ and $R_2$ are located in the top row and pixel values $R_1$ and $R_3$ are located in the bottom row. Since four pixel values are calculated simultaneously, after calculating one set of pixel values, the recomposition module moves two positions to the next set of pixel values to be generated.

Figure 8B:
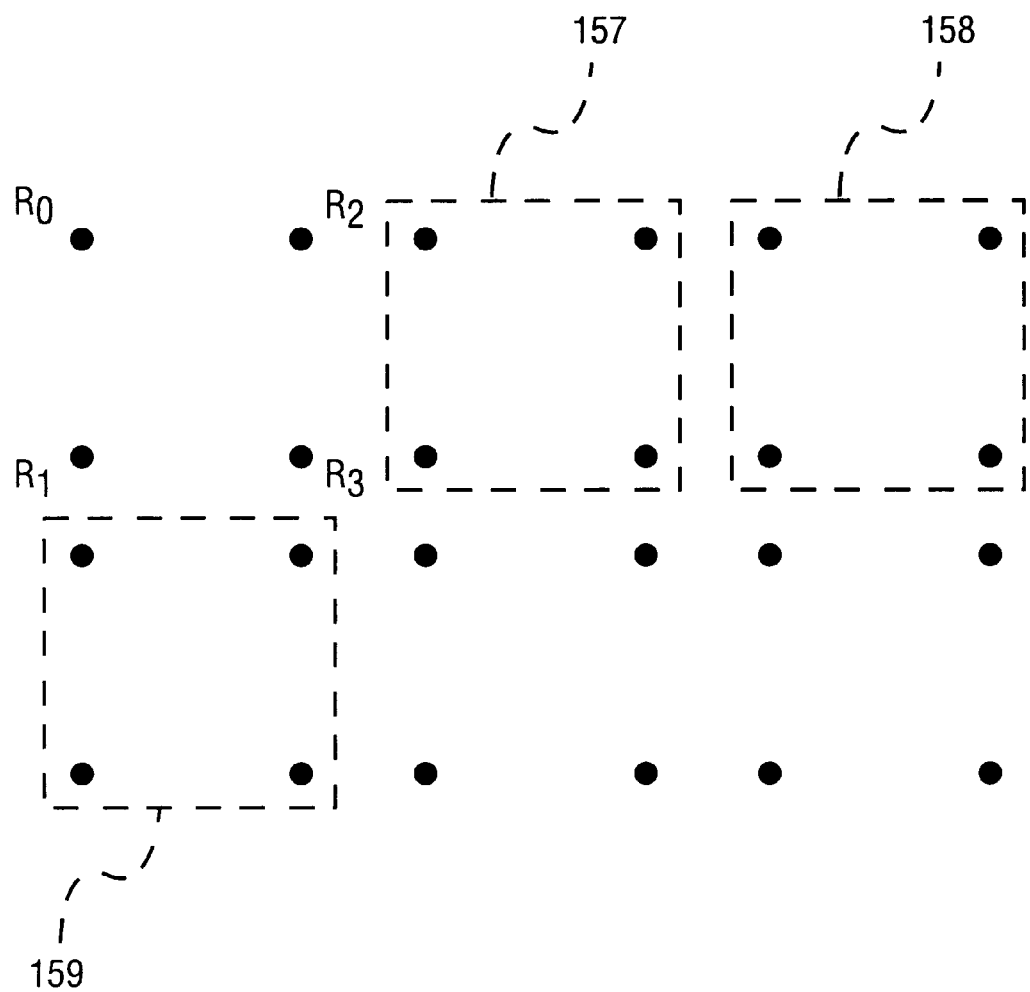
FIG. 8B illustrates a portion of an image represented by multiple groups of pixels.

For example, FIG. 8B illustrates a portion of an image represented by multiple groups or sets of pixels. FIG. 8B includes the four pixel values ($R_0$–$R_3$) shown in FIG. 8A. Additionally, FIG. 8B includes several additional sets of pixels 157, 158, and 159, identified by broken lines. After the recomposition module has calculated values for $R_0$–$R_3$, the module increments two columns to the right and calculates the values for the four pixels identified by set 157. After calculating the values for set 157, the module again increments two columns to the right and calculates the values for the four pixels identified by set 158. When the module reaches the end of a row, it returns to the beginning of the row two pixels below the current row (e.g., the four pixels identified by set 159).

Figure 9:
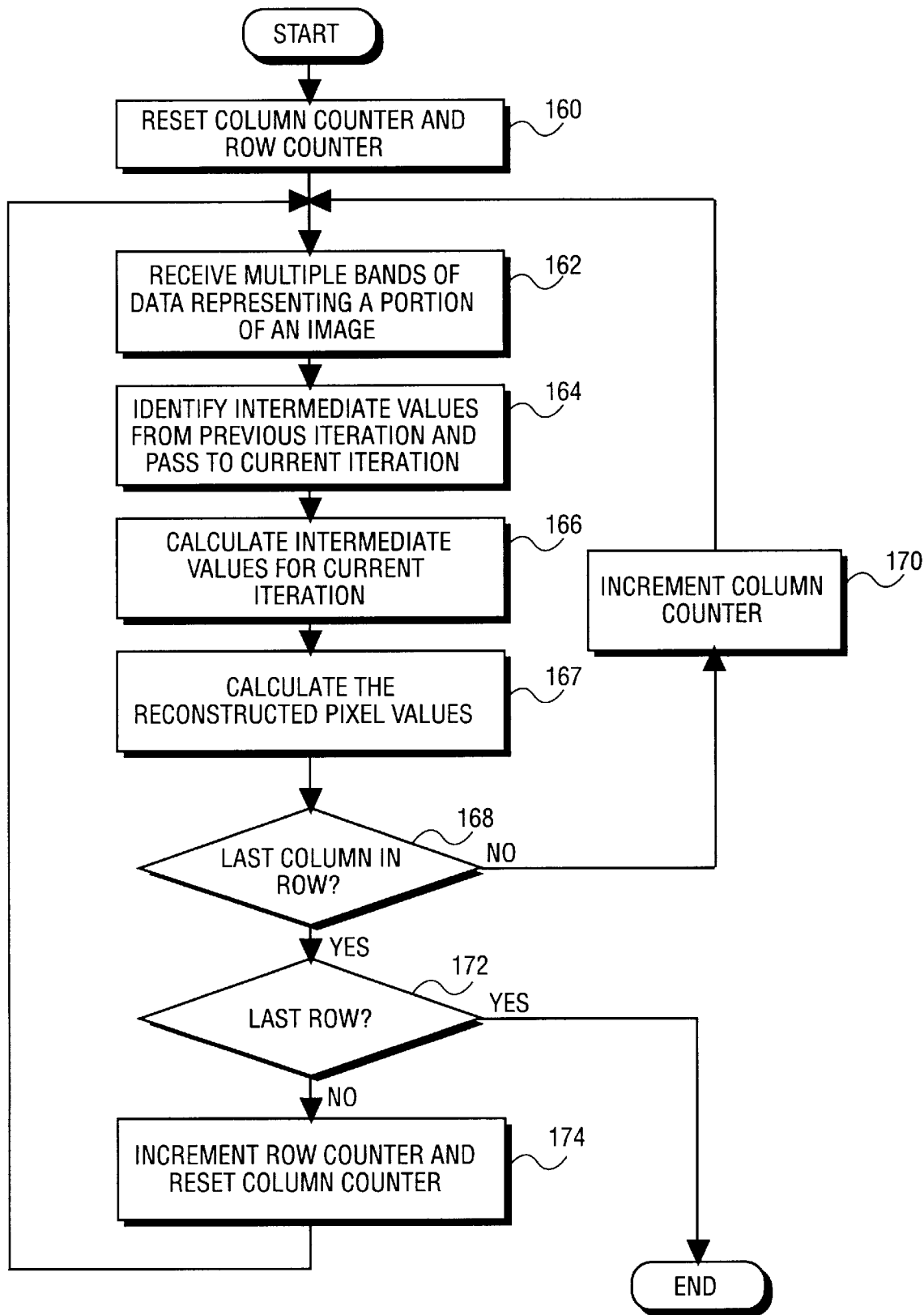
FIG. 9 is a flow diagram illustrating an embodiment of a procedure for performing wavelet recomposition.

FIG. 9 is a flow diagram illustrating an embodiment of a procedure for performing wavelet recomposition. At step 160, a column counter and a row counter are reset. The column counter and row counter are used to identify the position within the image that is currently being recomposed. In a particular embodiment of the invention, the procedure begins in the upper left corner of the image and calculates pixel values for each row of pixels until all rows in the image have been decoded (or recomposed). In this embodiment, the column counter and row counter may be reset to zero, which indicates the upper left corner of the image.

At step 162 of FIG. 9, multiple bands of data are received (e.g., Band 0 –Band 3), in which the multiple bands represent a portion of an image. Step 164 identifies the intermediate values from the previous iteration (i.e., A(j), B(j), C(j), and D(j), where j is the column index), if a previous iteration was performed. The intermediate values from the previous iteration are then passed to the current iteration as follows:

$$A(=j-n)=A(=j-n+1)$$

$$C(=j-n)=C(=j-n+1)$$

for n=N, . . . , 2, 1

$$B(j-m)=B(j-m+1)$$

$$D(j-m)=D(j-m+1)$$

for m=M, . . . , 2, 1 where N=max {filter $G_{00}$ length, filter $G_{01}$ length}−1 and M=max {filter $G_{10}$ length, filter $G_{11}$ length}−1

At step 166, new intermediate values are calculated for the current iteration. For example, in the recomposition module illustrated in FIG. 7, four new intermediate values A(j), B(j), C(j), and D(j) are calculated in each iteration. At step 167, the procedure calculates the reconstructed pixel values. For example, in the recomposition module of FIG. 7, four reconstructed pixel values $R_0$, $R_1$, $R_2$, and $R_3$ are calculated by the recomposition module.

The procedure of FIG. 9 continues to step 168 to determine whether the last column in a particular row has been reached. If the last column has not been reached, then the procedure branches to step 170 where the column counter is incremented to identify the next group of pixels to be decoded. Step 170 then returns to step 162 to receive the next bands of data representing the next portion of the image.

If step 168 determines that the last column in the row has been reached, then the procedure continues to step 172 to determine whether the last row of the image has been decoded. If the current row is the last row, then the procedure terminates, having received and decoded the entire image. If additional rows remain to be decoded, step 172 continues to step 174 where the row counter is incremented to identify the next group of pixels and the column counter is reset. The procedure then returns to step 162 to receive the next bands of data representing the next group of pixels in the image.

A particular embodiment of the recomposition module will be described using a (5,3) wavelet. In this embodiment, the wavelet filter bank is defined by $\{H_0, G_0, H_1, G_1\}$, which includes the following filter coefficients:

$h_0(n) = \frac{1}{4}\sqrt{2}(-1, 2, 6, 2, -1)$ $g_0(n) = \frac{1}{2}\sqrt{2}(1, 2, 1)$ with the origin at the second coefficient $h_1(n) = (-1)^n g_0(n) = \frac{1}{2}\sqrt{2}(1, -2, 1)$ $g_1(n) = -(-1)^n h_0(n) = \frac{1}{4}\sqrt{2}(1, 2, -6, 2, 1)$ with the origin at the second coefficient The wavelet used in this example is referred to as a (5,3) wavelet because $h_0$ and $g_1$ each have 5 filter coefficients and $g_0$ and $h_1$ each have 3 filter coefficients.

The polyphase filters that are derived from $G_0$ and $G_1$ are as follows:

$G_{00}(n) = (2)$ $G_{01}(n) = (1, 1)$ $G_{10}(n) = (2, 2)$ $G_{11}(n) = (1, -6, 1)$

In the above filters, $G_{00}(n)$ represents the odd (e.g., 1, 3, 5, etc.) coefficients of the $G_0(n)$ filter and $G_{01}(n)$ represents the even (e.g., 0, 2, 4, etc.) coefficients of the $G_0(n)$ filter. Similarly, filters $G_{10}(n)$ represents the odd coefficients of the $G_1(n)$ filter and $G_{11}(n)$ represents the even coefficients of the $G_1(n)$ filter.

Using the recomposition module shown in FIG. 7, the intermediate values are defined as:

$A(j) = 2[B_0(i, j) + \{B_1(i, j) + B_1(i-1, j)\}]$ $B(j) = 2[B_2(i, j) + \{B_3(i, j) + B_3(i-1, j)\}]$ $C(j) = \{B_2(i, j) + B_2(i+1, j)\} + \{B_3(i-1, j) + B_3(i+1, j) - 6B_3(i, j)\}$ $D(j) = \{B_0(i, j) + B_0(i+1, j)\} + \{B_1(i-1, j) + B_1(i+1, j) - 6B_1(i, j)\}$

The intermediate values from the previous iteration can be used in the current iteration in the following manner:

$A(j-n) = A(j-n+1)$ $C(j-n) = C(j-n+1)$ for $n = N, \ldots, 2, 1$ where $N = \max \{\text{filter } G_{00} \text{ length, filter } G_{01} \text{ length}\} - 1$ For example, if the $G_{00}$ filter length is 1 and the $G_{01}$ filter length is 2, then $N = 2 - 1 = 1$. If $n = 1$, then:

$A(j-1) = A(j)$ and $C(j-1) = C(j)$

Additionally, $B(j-m) = B(j-m+1)$ $D(j-m) = D(j-m+1)$ for $m = M, \ldots, 2, 1$ where $M = \max \{\text{filter } G_{10} \text{ length, filter } G_{11} \text{ length}\} - 1$ For example, if the $G_{10}$ filter length is 2 and the $G_{11}$ filter length is 3, then $N = 3 - 1 = 2$. Thus:

$B(j-2) = B(j-1)$ and $B(j-1) = B(j)$ $D(j-2) = D(j-1)$ and $D(j-1) = D(j)$

Based on the above intermediate values, the calculations for pixel values $R_0, R_1, R_2,$ and $R_3$ can be simplified as follows:

$R_0 = 2[A(j) + B(j) + B(j-1)]$ $R_1 = 2[C(j) + D(j) + D(j1)]$ $R_2 = A(j) + A(j+1) + B(j1) + B(j+1) - 6B(j)$ $R_3 = C(j) + C(j+1) + D(j1) + D(j+1) - 6D(j)$

Figure 10:
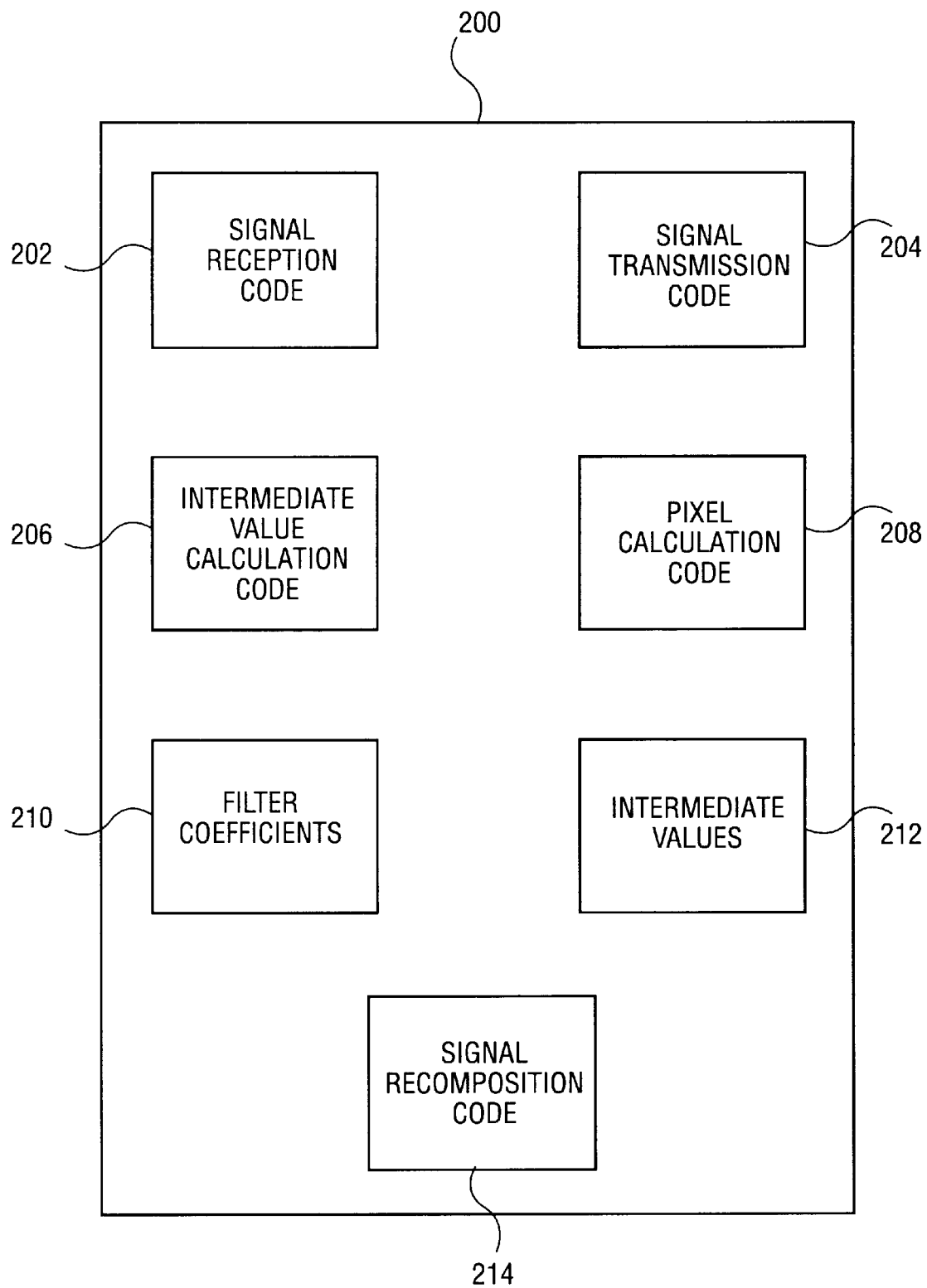
FIG. 10 illustrates an embodiment of a processor-readable medium containing various information used by a computer or other processing device for wavelet recomposition.

FIG. 10 illustrates an embodiment of a processor-readable medium 200 containing various information used by a computer or other processing device. The embodiment illustrated in FIG. 10 is suitable for use with the signal processing systems discussed above. The code sequences and other information stored on medium 200 are capable of performing the various recomposition functions discussed herein. Processor-readable medium 200 may also be referred to as a computer-readable medium. Processor-readable medium 200 may be any type of magnetic, optical, or electrical storage medium including a disk, diskette, CD-ROM, memory device, or similar storage medium.

Processor-readable medium 200 includes signal reception code 202, which handles an incoming flow of data to a recomposition module. Signal transmission code 204 is responsible for controlling the flow of data representing the recomposed image to one or more destinations. Intermediate value calculation code 206 identifies intermediate values from previous iterations and calculates intermediate values for the current iteration. Pixel calculation code 208 calculates pixel values using the procedures and recomposition modules discussed above. Filter coefficients 210 are used by the filters in a recomposition module to perform their respective filtering operations. One or more intermediate values 212 may be stored on the processor-readable medium for a particular time. Signal recomposition code 214 controls the overall operation of the recomposition module, such as controlling the incrementing of row and column counters.

Alternate embodiments of computer-readable medium 200 may include only a portion of information and instruction code shown in FIG. 10. Additionally, other code sequences, instructions, and information may be generated during execution of the various procedures described herein. Those of ordinary skill in the art will appreciate that various code sequences, instructions, and procedures may be utilized by an end-system to implement the teachings of the present invention.

In the above description of the invention, various examples are illustrated with respect to the processing of video data. However, the systems and procedures described above may also be applied to any type of data collection, such as audio data.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of reconstructing a video image comprising:

(a) receiving a set of encoded video image data from an encoder;

(b) identifying intermediate values calculated during a previous iteration if the previous iteration was performed;

(c) calculating intermediate values for a current iteration based on the set of encoded video image data received in step (a) and the intermediate values identified in step (b); and (d) generating a plurality of pixel values based on the intermediate values calculated in step (c).

2. The method of claim 1 further including the step of saving the results of the calculation performed in step (c) for use by a subsequent iteration.

3. The method of claim 1 further including the step of repeating steps (a) through (d) until an entire image has been reconstructed.

4. The method of claim 3 wherein each repetition of steps (a) through (d) uses a subsequent set of data.

5. The method of claim 1 wherein the plurality of sets of data are represented by wavelets.

6. The method of claim 1 wherein step (d) generates a two-dimensional array of pixel values.

7. A method of reconstructing a video image comprising:

(a) calculating intermediate values for a first iteration based on information contained in a first set of encoded video image data;

(b) generating a plurality of pixel values based on the intermediate values calculated in step (a);

(c) receiving a next set of encoded video image data from an encoder;

(d) identifying intermediate values calculated in a preceding iteration;

(e) calculating intermediate values for a current iteration based on information contained in the next set of encoded video image data and the intermediate values identified in step (d);

(f) generating a plurality of pixel values based on the intermediate values calculated in step (e); and (g) repeating steps (c) through (f) until the entire image has been reconstructed.

8. The method of claim 7 further including the step of saving the intermediate values for use by a subsequent iteration.

9. The method of claim 7 wherein the sets of data are represented by wavelets.

10. The method of claim 7 wherein steps (b) and (f) generate a two-dimensional array of pixel values.

11. A computer software product including a medium readable by a processor, the medium having stored thereon a sequence of instructions which, when executed by the processor, cause the processor to:

receive a set of encoded video image data from an encoder;

identify intermediate values calculated during a previous iteration if the previous iteration was performed;

calculate intermediate values for a current iteration based on the received set of encoded video image data and the identified intermediate values; and generate a plurality of pixel values based on the calculated intermediate values.

12. The computer software product of claim 11 further including a sequence of instructions which, when executed by the processor, cause the processor to save the calculated intermediate values for use by a subsequent iteration.

13. The computer software product of claim 11 wherein the plurality of sets of data are represented by wavelets.

14. The computer software product of claim 11 wherein the plurality of pixel values form a two-dimensional array of values.

15. A decoding apparatus comprising:

a data receiver for receiving a set of encoded video image data from an encoder;

a value identifier for identifying intermediate values calculated during a previous iteration if the previous iteration was performed;

a calculator for calculating intermediate values for a current iteration based on the received set of encoded video image data and the identified intermediate values; and a value generator for generating a plurality of pixel values based on the calculated intermediate values.

16. The decoding apparatus of claim 15 further comprising a storage medium for storing the calculated intermediate values for use by a subsequent iteration.

17. The decoding apparatus of claim 15 wherein the data receiver, the value identifier, the calculator and the value generator are iteratively performed until the entire image has been reconstructed.

18. The decoding apparatus of claim 15 wherein the plurality of sets of encoded data are represented by wavelets.

19. The decoding apparatus of claim 15 wherein the plurality of pixel values form a two-dimensional array of values.

* * * * *

UNITED STATES PATENT AND TRADEMARK OFFICE
CERTIFICATE OF CORRECTION

PATENT NO.    : 6,125,210
DATED         : September 26, 2000
INVENTOR(S)   : Yang It is certified that error appears in the above-identified patent and that said Letters Patent is hereby corrected as shown below:

Column 8,
Line 27, delete "A(=j-n)=A(=j-n+1)", insert -- A(j-n)=A(j-n+1) --.
Line 28, delete "C(=j-n)=C(=j-n+1)", insert -- C(j-n)=C(j-n+1) --.

Column 10,
Line 2, delete "D(j1)", insert -- D(j-1) --.
Line 3, delete "B(j1)", insert -- B(j-1) --.
Line 4, delete "D(j1)", insert -- D(j-1) --.

Signed and Sealed this

Eighteenth Day of June, 2002

*Attest:*

JAMES E. ROGAN
*Attesting Officer*   Director of the United States Patent and Trademark Office